United States Patent Office 3,475,573
Patented Oct. 28, 1969

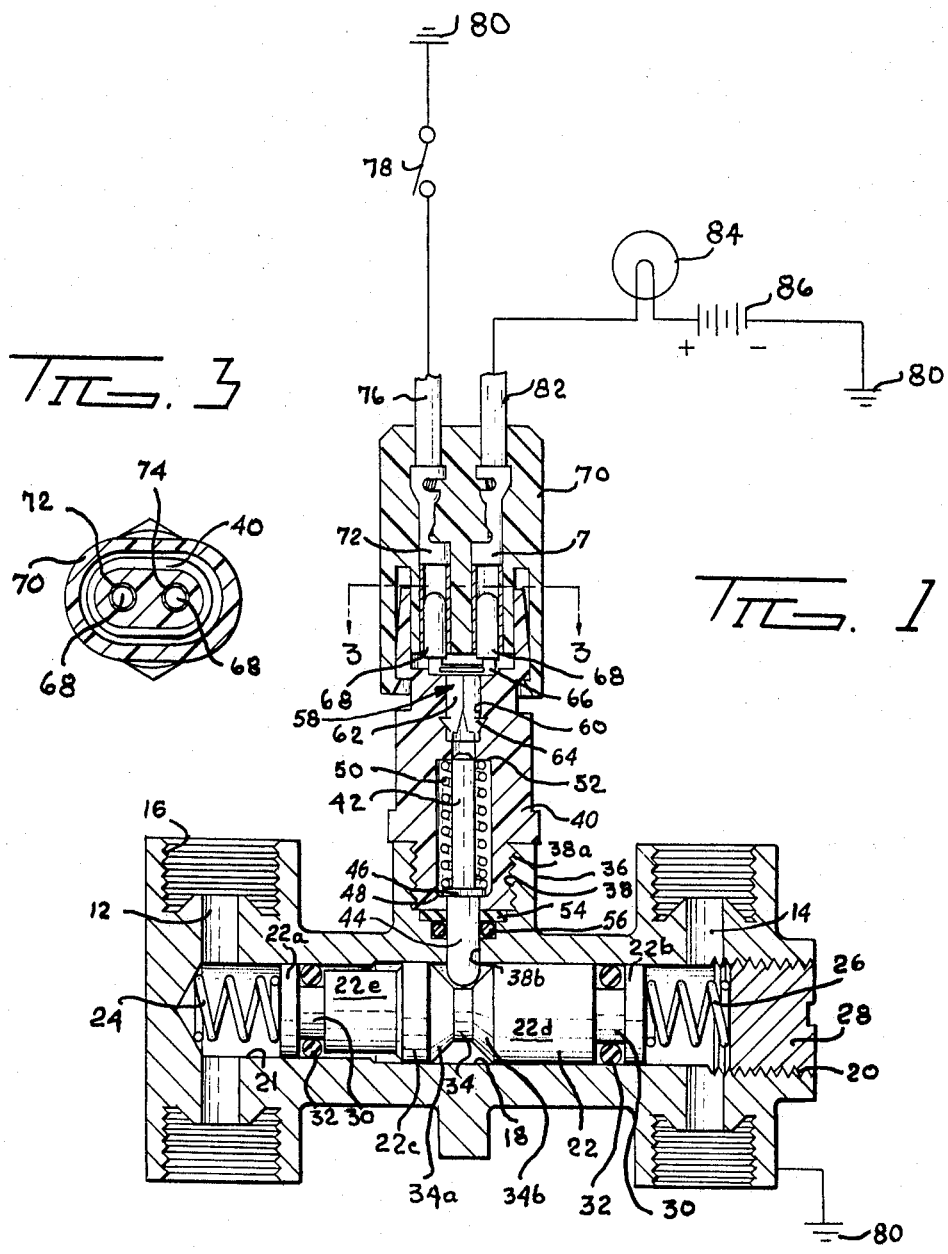

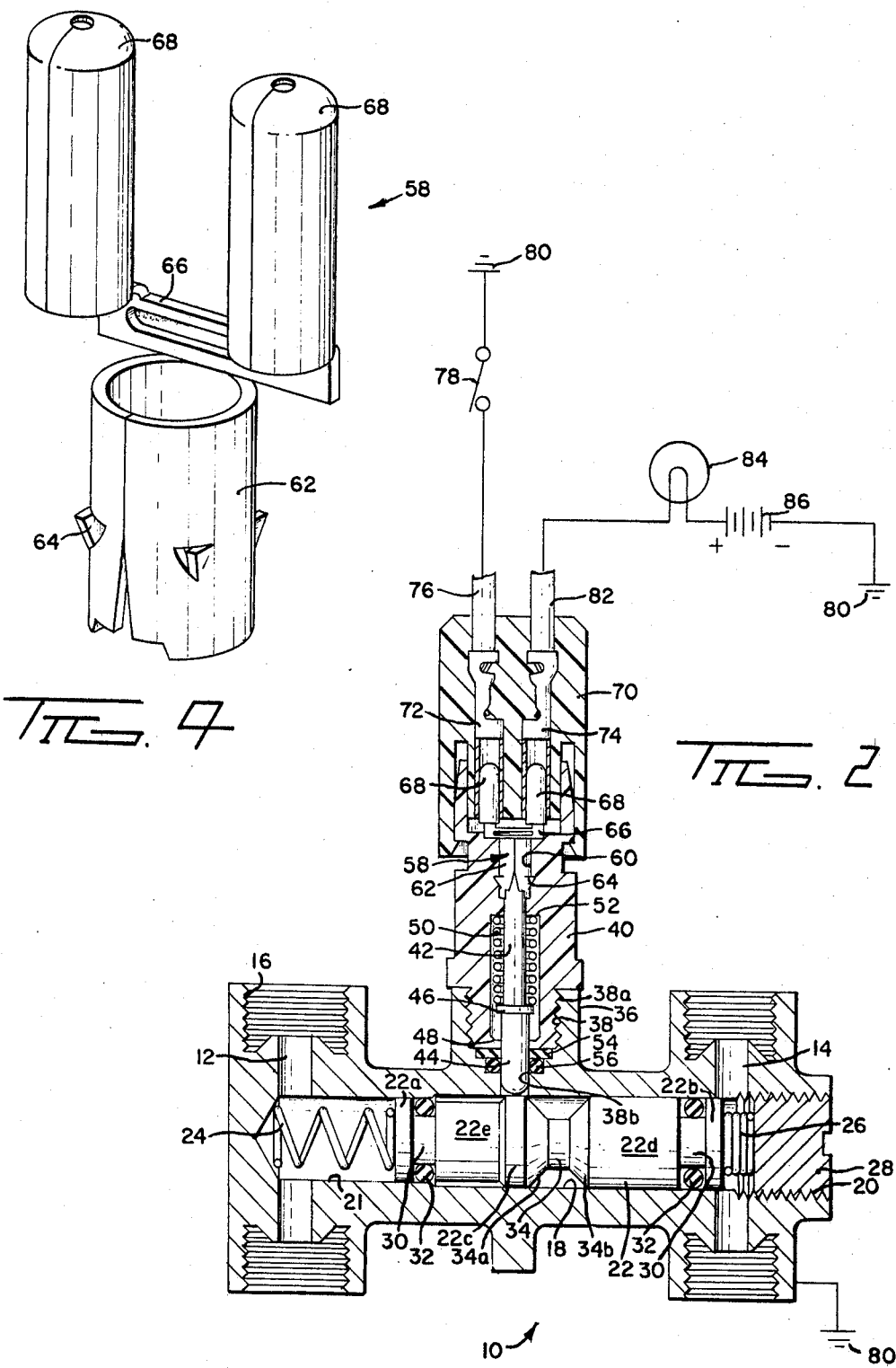

3,475,573
BRAKE SYSTEM SIGNALING DEVICE
Frederick Jean Maltais, Camp Hill, and Richard Lee Beck, York, Pa., assignors to AMP Incorporated, Harrisburg, Pa.
Filed Feb. 21, 1967, Ser. No. 617,612
Int. Cl. H01h 35/38
U.S. Cl. 200—82          4 Claims

ABSTRACT OF THE DISCLOSURE

A device for signaling the loss of pressure within the braking system of a wheeled vehicle. The pressure loss causes the mating of electrical contact members which actuates a warning light visible to the vehicle operator.

CROSS-REFERENCES TO RELATED APPLICATIONS

This application is related to U.S. application Ser. No. 542,353, filed Apr. 13, 1966, now Patent No. 3,394,401, by Lincoln Edwin Roberts, and entitled Fluid System Safety Device, said application having a common assignee with the instant application.

BACKGROUND OF THE INVENTION

Field of the invention

Pressure responsive switch for signaling pressure differential in fluid system.

Description of the prior art

The above identified copending application describes a device for signaling pressure loss in a fluid system. One problem with the device is that the vehicle operator cannot determine whether the device is functioning. If the indicator lamp is burned out or if there is a break in the lamp circuit the operator will not be warned of a pressure loss.

SUMMARY OF THE INVENTION

This invention provides a device for signaling the operator of a vehicle if these is a pressure loss in the braking system of the vehicle. The operability of the sensing device can be tested by moving the vehicle ignition switch to the accessory position. The device is designed for use on vehicles employing a dual master brake cylinder or equipment whereby hydraulic or pneumatic fluid is supplied independently to the front wheel brakes and the rear wheel brakes. In such systems it is often difficult for the operator to determine if pressure is lost in one of the lines since the vehicle would still have braking power.

BRIEF DESCRIPTION OF THE DRAWING

FIGURE 1 is a cross-sectional view of a signaling device made in accordance with the teachings of the present invention;

FIGURE 2 is a cross-sectional view similar to FIGURE 1 showing the device in its actuated position;

FIGURE 3 is a cross-sectional view taken along the line 3—3 of FIGURE 1; and

FIGURE 4 is an enlarged perspective view of the contact member of the device shown in FIGURE 1.

DESCRIPTION OF THE PREFERRED EMBODIMENT

The attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purpose of illustration in order that others skilled in the art may fully understand the invention and the principles thereof and the manner of applying it in practical use so that they may modify it in various forms, each as may be best suited to the conditions of a particular use.

With reference to FIGURE 1 there is shown a body member 10 made of a suitable metallic material and having a pair of passageways 12 and 14 extending therethrough. The passageways are threaded at their ends as indicated at 16 to threadably receive coupling members secured to the fluid lines extending between the master cylinder of the vehicle and the front and rear wheel brake mechanisms. By way of example the passageway 12 may be interposed in the fluid line passing between the master cylinder and the front wheel brakes while the passageway 14 may be interposed in the fluid line passing between the master cylinder and the rear wheel brakes.

A cylindrical aperture 18 is disposed in body member 10 and communicates with the passages 12 and 14. The aperture 18 is threaded at one end as indicated at 20 and has a reduced diameter portion at its inner or opposite end as indicated at 21. A shuttle member 22 is disposed within aperture 18 for linear movement therein. The shuttle member may be provided with biasing springs 24 and 26 at its opposite ends, these springs normally biasing the shuttle member 22 to a central position between the passageways 12 and 14. If the biasing springs 24 and 26 are not used the shuttle may be positioned mechanically with hydraulic pressure being exerted on both ends. The threaded portion 20 is provided for receiving a plug nut 28 to thereby retain the shuttle 22 within the aperture.

Shuttle 22 is provided with a pair of end flanges 22a and 22b and a pair of circumferential grooves 30 within which are disposed suitable sealing means such as the O-rings 32. Flanges 22a and 22b are of unequal diameter in accordance with the variations in the diameter of aperture 18. The O-ring disposed in the reduced diameter portion 21 of aperture 18 is smaller than the O-ring disposed in the large diameter portion of aperture 18. The O-rings provide a fluid seal to maintain the separation between the fluid lines passing to the front wheel brakes and the rear wheel brakes. At the central portion of shuttle 22 there is provided a relieved portion 34 having sloping sides 34a and 34b. The slope of side 34a is more gradual than that of side 34b for a reason to be described. Sides 34a and 34b blend into large diameter portions 22c and 22d respectively of the shuttle member. Section 22c narrows down into a portion 22e, the portion 22e being of a size to be receivable within the reduced diameter portion 21 of the aperture 18.

Body member 10 is provided with a boss 36 having a stepped opening 38 extending therethrough and communicating with the aperture 18. A hollow non-metallic switch body 40 is disposed within the opening 38a and secured therein by suitable means such as threads. A plunger 42 is disposed within the switch body 40 and is capable of limited sliding movement relative thereto. Plunger 42 is normally biased so as to have an end 44 extending beyond the end of the switch body 40 through the opening 38b. The opening 38b extends into the aperture 18 and therefor presents a sharp surface within the wall of the aperture. It is for this reason that the left hand side of shuttle 22, as viewed in FIGURE 1, is made of a reduced diameter. If the shuttle did not have a reduced diameter portion the O-ring 32 on the left hand side of the shuttle would be seriously cut up as it passed by opening 38b during assembly of the device and the O-ring would therefore be an effective seal. By reducing the diameter of the left hand portion of the shuttle the left hand O-ring 32 is permitted to be smaller in diameter than the larger portion of aperture 18 and therefore the O-ring passes freely beneath opening 38b without contacting the sharp edge thereof.

Since flange 22a is smaller in diameter than flange 22b an equal pressure in passageways 12 and 14 will result in a lower force being applied to flange 22a than to flange 22b. The amount of force developed in the shuttle 22 will determine movement of the shuttle and thereby movement of the plunger 42 as the plunger end 14 is cammed by engagement with the sides 34a and 34b of the relieved portion of the shuttle. Since a lower force will be developed against flange 22a the slope of side 34a is made more gradual than that of side 34b to compensate for this and to insure that the plunger 42 will respond in a like manner to the pressure developed in passageways 12 and 14.

A suitable flange 46 is provided on the plunger 42 to limit movement of the plunger externally of the switch body 40. A lip 48 extends around the lower end of switch body 40 and is in engagement with the flange 46 to thereby act as a stop means for the plunger. The lip 48 may be formed after the plunger 42 is inserted into the switch body 40 by applying heat to the end of body 40 to thereby allow the material to flow and to be shaped as desired. The biasing spring 50 extends between the flange 46 and a shoulder 52 formed internally of the switch body 40. The spring 50 thus normally exerts a downward force, as seen in FIGURE 1, on a plunger 42 to seat the plunger end 44 within the relieved portion 34 of the shuttle 22.

In order to insure against the possibility of fluid escaping from the system if either of seals 32 leak there is provided at the end of switch body 40 a sealing washer 54 and an O-ring 56, the washer and O-ring snugly engaging the sides of plunger end 44 and the sides of the stepped opening 38.

At the upper end of switch body 40 there is provided a metallic contact member 58 which is placed within an opening 60 in the switch body. Member 58 (see also FIGURE 4) has a barrel portion 62 on which is provided a plurality of barbs 64 which will bite into the interior walls of switch body 40 to thereby prevent movement of the contact member. The barrel 62 is normally spaced a small distance from the upper end of the plunger 42 as can be seen in FIGURE 1, the barrel being of appropriate size to receive the plunger therein upon upward movement of the plunger.

The contact member 58 further includes a conductive strap portion 66 from which there extends a pair of terminals 68 which may be of pin-like configuration.

A mating connector element 70 is provided and engages the upper of switch body 40. The connector 70 comprises a pair of contact members 72 and 74 adapted for electrical contact with the members 68. The contact 72 is secured to the end of a wire conductor 76, which conductor extends to a normally open switch 78 representative of the vehicle ignition. The switch 78 is suitably connected to ground as indicated at 80. Contact 74 is secured at the end of a wire conductor 82 which passes to one side of a warning light 84 which may be positioned on the dashboard of the motor vehicle. The opposite end of warning light 84 is connected to a power source 86, i.e. the vehicle battery, and subsequently to ground 80. Body member 10 is also grounded at 80 to complete the electrical circuit.

The operation of the device will now be set forth in detail. When the vehicle ignition is in the "off" position the device will be in the position shown in FIGURE 1. The warning light 84 will not be lit since the circuit is broken by the switch 78 and by the gap between the plunger 42 and the contact member 58. Moving the vehicle ignition to the accessory position will close switch 78 thereby causing one portion of the circuit to be complete. Current will flow through the conductors 76 and 82 and through the light 84 causing the light to be lit which indicates that the light is operative and that all electrical connections are secure. Moving the ignition to the normal running or "on" position will again cause switch 78 to move to its normally open position thereby extinguishing the light 84.

When the vehicle braking system is functioning properly there will be adequate fluid in the lines between the master cylinder and the front and rear wheel brakes and therefore the fluid pressure passing through passageways 12 and 14 in body member 10 will be approximately equal. Therefore the shuttle member 22 will be maintained in its intermediate position allowing the plunger 42 to remain out of contact with barrel 62.

If a leak should occur in the fluid line passing to the rear wheel brakes, for example, the fluid pressure in passageway 14 would decrease a predetermined amount below the pressure in passageway 12. The decrease in pressure in passageway 14 would allow the shuttle member 22 to move to the right into the position shown in FIGURE 2 against the bias of spring 26. As shuttle 22 moves to the right the plunger end 44 will be cammed out of the relieved portion 34 and will therefore be forced upwardly against the bias of spring 50. The upward movement of plunger 42 will cause the plunger to contact the barrel 62 of the contact 58 and thus complete the electrical circuit to send current through the warning light 84 thereby actuating the light. When the light appears on the dashboard of the vehicle the operator will immediately know that one of the brake lines is losing fluid. The operator will then have the opportunity to run the vehicle on the one remaining brake line until the vehicle can be repaired.

Should a leak occur in the fluid line leading to the front wheel brakes a similar sequence of events will occur with the exception that the shuttle 22 will move to the left as seen in the figures rather than to the right.

Changes in construction will occur to those skilled in the art and various apparently different modifications and embodiments may be made without departing from the scope of the invention. The matter set forth in the foregoing description and accompanying drawings is offered by way of illustration only.

We claim:
1. A pressure responsive switch for signaling the loss of pressure within the braking system of a motor vehicle wherein fluid is supplied substantially independently to the front wheel brakes and the rear wheel brakes of the vehicle, comprising in combination a body member having a pair of passageways extending therethrough, one said passageway being for communication with the fluid passing to the front wheel brakes, the second said passageway being for communication with the fluid passing to the rear wheel brakes, a cylindrical aperture disposed within said body member and communicating at its ends with each said passageway, a shuttle member disposed within said aperture intermediate the said passageways, said shuttle member having a pair of camming surfaces intermediate the ends thereof, an opening disposed within said body member and communicating with said cylindrical aperture, a hollow switch body disposed within said opening, a plunger disposed within said switch body and normally biased to project from said switch body and between said pair of camming surfaces on said shuttle member, a contact member secured within said switch body in alignment with said plunger and normally spaced therefrom, said contact member having first means positioned to selectively engage said plunger and having second means for connection to a warning signal and to the normally open vehicle ignition switch, said second means comprising a first terminal for connection to said warning signal and a second terminal for connection to said ignition switch, said first and second terminals being joined by electrically conductive material, whereby said warning signal may be actuated either by closing said ignition switch or by a predetermined difference in pressure between the fluid lines leading to the front and rear wheel brakes.

2. A pressure responsive switch as set forth in claim 1 wherein said contact member first means comprises a barrel portion coaxial with said plunger and arranged to receive said plunger upon movement of said shuttle member, whereby said camming surfaces cause said plunger to move approximately at right angles to the movement of said shuttle member to create electrical continuity between said plunger and said contact member.

3. A pressure responsive switch as set forth in claim 2 further comprising a plurality of barb means positioned about said barrel portion for engaging said switch body and securing said contact member relative thereto.

4. A pressure responsive switch as set forth in claim 1 wherein said pair of terminals are pin members.

References Cited
UNITED STATES PATENTS 3,358,097   12/1967   Kersting _____ 200—82  
3,394,401   8/1968   Roberts _____ 200—82

H. O. JONES, Primary Examiner  
H. BORKS, Assistant Examiner

U.S. Cl. X.R.

340—52